United States Patent Office 3,402,994
Patented Sept. 24, 1968

3,402,994
ALKALI METAL CYANIDE PREPARATION
Eric Lois Tollefson and Donald J. McGirr, Edmonton, Alberta, Canada, and John C. Clunie, Summit, N.J., assignors to Chemcell (1963) Ltd., Montreal, Quebec, Canada, a corporation of Canada
No Drawing. Filed Mar. 1, 1965, Ser. No. 436,307
4 Claims. (Cl. 23—79)

ABSTRACT OF THE DISCLOSURE

Disclosed herein is an improved method of preparing alkali metal cyanides. The method comprises reacting an alkali metal alcoholate with HCN in an anhydrous alcohol reaction medium. This method obviates the separation problems encountered when an aqueous system was employed.

---

This invention relates to a process for the production of alkali metal cyanides.

It is known that alkali metal cyanides can be made by a simple neutralization reaction between an alkali metal hydroxide and hydrocyanic acid (HCN) to produce water and the desired alkali metal cyanide. See U.S. Patent 1,596,119. This is an equilibrium reaction and therefore the extent to which the reaction is induced to proceed toward the production of the metal cyanides is dependent to a great extent upon the removal from the system of either the metal cyanide or the water product. Since alkali metal cyanides are generally quite soluble in water, removal of either the water or the cyanide from the system poses a real problem. Further, since alkali metal hydroxides are also generally quite soluble in water, there is an end product contamination problem, i.e., alkali metal cyanides and hydroxides both being soluble in reaction product water, it is difficult to resolve the reaction mass into desired product, water and unreacted reactant.

U.S. Patent 2,381,285 recognizes this problem of separating reactant and reaction product from each other in aqueous solution. This patent suggests that this problem can be solved by reacting alkali metal salts of mono and poly nuclear phenols exhibiting acidic characteristics with HCN in a heterocyclic ether reaction medium. It is suggested that the alkali metal phenolate can be obtained by reacting alkali metal hydroxide and a phenol either separately from the cyanide reaction medium or directly in the reaction medium. No distinction regarding the desirability of either preparative method is made. It should be understood that water is one of the reaction products of alkali metal phenylate preparation. This water is said to be removed from the reaction mass by distillation from or addition of dehydrating agents to the reaction mass.

It has now been found that substantially all the problems inherent in the known process for preparing alkali metal cyanides from alkali metal hydroxides are overcome or at least obviated by carrying out a preparative reaction to make alkali metal cyanides in such a manner that substantially no water is ever present in the reactants, reaction mixture or reaction product. Further, the instant invention represents an improvement over the above discussed use of phenolates and heterocyclic ether solvents.

This invention then comprises, in one aspect thereof, the reaction of HCN and an alkali metal alcoholate in a substantially anhydrous reaction medium to produce alkali metal cyanide and the alcohol corresponding to the reactant alcoholate. It is a particularly desirable aspect of this invention to carry out this reaction in an alcohol reaction medium corresponding to the alcohol reaction product. Where the desired reaction product is to be recovered by filtration, the preferred recovery technique, an important consideration in the practice of this invention is that the alcoholate and the alkali metal should be related in that the alkali metal cyanide should be insoluble in the reaction medium alcohol whereas the alkali metal should be capable of forming an alcoholate and this alcoholate should be soluble in the reaction medium alcohol.

It may also be practical to recover the desired product by vacuum evaporation, in which case solubility of the cyanide and alcoholate are not critical factors.

Generally, it can be stated that all of the alkali metals, e.g., lithium, sodium, potassium, rubidium, cesium, etc. are adapted to use in this invention. It can also be stated that substantially any alcohol, subject to the above conditions, can also be used, e.g., alkyl alcohols (methyl, ethyl, propyl, hexyl, etc.), alkoxy alkyl alcohols (methoxy, ethoxy, propoxy, hexyloxy, poly alkoxy, etc. alkyl) and substituted alkyl alcohols (provided the substituent does not interfere with the alcoholate formation or metal cyanide formation).

Further, as has been previously stated, it is particularly desirable to employ in this process an alcohol and an alcoholate having the same alkoxy (including substituted alkoxy) moiety since this greatly simplifies recovery procedures. Thus, for example, sodium ethoxide in ethanol can conveniently be used.

The instant invention is suitably carried out by reacting the appropriate alkali metal hydroxide (e.g., caustic) with the appropriate alcohol (e.g., ethanol, butanol or a mixed alcohol stream); subjecting the resulting alcoholate reaction product containing mass to distillation under such conditions that water is removed from the alcoholate reaction product. For example, azeotropic distillation in the presence of an azeotroping agent for the water (isopropanol, benzene, etc.); drying the resulting alkali metal alcoholate; reacting the substantially anhydrous alkali metal alcoholate with hydrogen cyanide, preferably in the liquid state, under substantially anhydrous conditions; and recovering the alkali metal cyanide product of this reaction. The cyanide forming reaction is preferably carried out in an alcoholic reaction medium and the alkali metal cyanide precipitates from this reaction medium. The cyanide reaction product is recovered by removing from admixture therewith any alcohol reaction medium which adheres thereto. The cyanide product may be processed to any desired form after separation from the alcohol.

The process of the instant invention can be carried out batchwise or continuously, or it may be carried out partially batchwise and partially continuously as desired. It is preferred to operate continuously.

The alcoholate-forming reaction can be carried out with alkali metal hydroxide flake, if available and desired, and with pure or mixed alcohols. The temperature of this reaction is dependent upon the alcohol and alkali metal being reacted, suitably at about 10 to 150° C. at atmospheric to several atmospheres pressure; preferably 20 to 100° C.

The distillation may employ as a water-azeotroping agent the alcoholic moiety of the alcoholate, if this is possible, or a third substance can be added to azeotrope out the water. The distillation temperature and pressure are determined by a consideration of the azeotroping agent, if any, used and the alcoholate product being treated, suitably about 30 to 100° C. at 0 to 50 p.s.i.g.

The substantially anhydrous alcoholate, suitably in solution in the corresponding alcohol, is mixed with liquid HCN and the mixture fed to a reactor operating at a temperature of about 0 to 120° C. and a pressure from atmospheric to several atmospheres, depending upon the particular alkali alcoholate being reacted. In the case of sodium butoxide, the reaction is preferably carried out at about 20 to 40° C.

As the alkali metal cyanide is produced in the HCN-alkali metal alcoholate reaction, it precipitates. The precipitated cyanide can be removed from the reactor continuously as formed, or in a batch type reactor, when the reaction is substantially complete the entire precipitate can be removed from the reactor. The removed product has some of the reaction mass liquid remaining thereon (particularly the alcohol reaction medium) even after removal thereof from the reactor. The cyanide product is freed from the remaining reaction medium, e.g. by washing, evaporation or selective solution, etc., and the "dried" product is put in suitable form or used as the case may be.

In each of the above discussed reactions, alcoholate preparation and cyanide production, the two reactants can be fed in stoichiometric proportions or either reactant can be fed in excess. Where an excess of one reactant is used, it may be desirable to recover and recycle the excess.

The following specific example is given by way of exemplification and not limitation of this invention. All proportions are in parts by weight or weight percent unless specified to the contrary.

EXAMPLE

Sodium cyanide was prepared by reacting 46.3 parts of liquid HCN (1.7 moles) with 643 parts of a 25.6% solution of sodium butoxide in butanol (1.7 moles of sodium butoxide) at a temperature between 25 and 35° C. and at atmospheric pressure. The precipitated product was removed from the reactor and heated to about 40° C. under vacuum to drive oil residual reaction liquid whereupon 86 parts of product were recovered (yield=98.8% based upon sodium butoxide) having a purity of 96.4%.

It is to be understood that the foregoing detailed description is given merely by way of illustration and that many variations may be made therein without departing from the spirit of our invention.

The embodiments of the invention in which an exclusive property or privilege is claimed are defined as follows:

1. Process for producing an alkali metal cyanide which comprises reacting substantially anhydrous alkali metal alcoholate with HCN in a substantially anhydrous alcohol reaction medium to produce an alkali metal cyanide which is insoluble in the reaction mixture.

2. Process as claimed in claim 1 wherein said alkali metal alcoholate and said HCN are soluble in said alcohol.

3. Process as claimed in claim 1 wherein the alcoholic moiety of said alcoholate and said alcohol are the same.

4. Process as claimed in claim 3 wherein said alkali metal is sodium and said alcoholic moiety is butoxy.

References Cited

UNITED STATES PATENTS

| | | | |
|---|---|---|---|
| 1,596,119 | 8/1926 | Poindexter | 23—79 |
| 1,909,903 | 5/1933 | Schumann et al. | 23—79 |
| 1,950,879 | 3/1934 | Carlisle et al. | 23—79 |
| 2,121,020 | 6/1938 | Christmann | 23—79 |
| 2,381,285 | 8/1945 | Hill | 23—79 |
| 2,796,443 | 6/1957 | Meyer et al. | |
| 2,877,274 | 3/1959 | Kramis. | |

OSCAR R. VERTIZ, Primary Examiner.

B. H. LEVENSON, Assistant Examiner.